(12) United States Patent
Millan

(10) Patent No.: US 9,180,805 B2
(45) Date of Patent: Nov. 10, 2015

(54) ADJUSTABLE UTILITY TRAY

(71) Applicant: Sergio Millan, Santa Fe Springs, CA (US)

(72) Inventor: Sergio Millan, Santa Fe Springs, CA (US)

(73) Assignee: Reinhold Industries, Inc., Santa Fe Springs, CA (US)

( * ) Notice: Subject to any disclaimer, the term of this patent is extended or adjusted under 35 U.S.C. 154(b) by 90 days.

(21) Appl. No.: 14/013,308

(22) Filed: Aug. 29, 2013

(65) Prior Publication Data

US 2015/0061327 A1    Mar. 5, 2015

(51) Int. Cl.
  *A47B 83/02*  (2006.01)
  *B60N 3/00*   (2006.01)
  *B64D 11/06*  (2006.01)

(52) U.S. Cl.
  CPC ............ *B60N 3/004* (2013.01); *B64D 11/06* (2013.01)

(58) Field of Classification Search
  USPC .................. 297/163, 146, 164–169
  See application file for complete search history.

(56) References Cited

U.S. PATENT DOCUMENTS

| | | | |
|---|---|---|---|
| 121,471 A * | 12/1871 | Rankin ........................... | 297/163 |
| 3,773,381 A | 11/1973 | Brennan | |
| 4,159,071 A | 6/1979 | Roca | |
| 4,726,621 A * | 2/1988 | Muller ........................... | 297/146 |
| 4,863,140 A * | 9/1989 | Schriner ........................ | 248/639 |
| 5,088,135 A * | 2/1992 | Violette ............................ | 5/2.1 |
| 5,092,652 A * | 3/1992 | Macaluso ..................... | 297/146 |
| 5,626,323 A * | 5/1997 | Lechman et al. ........... | 248/286.1 |
| 5,704,698 A * | 1/1998 | Lin ............................. | 312/208.1 |
| 5,876,092 A | 3/1999 | An | |
| 5,954,408 A * | 9/1999 | Bogucki ..................... | 312/223.3 |
| 6,761,398 B2 | 7/2004 | Bentley et al. | |
| 6,814,404 B2 | 11/2004 | Jensen | |
| 6,827,026 B2 | 12/2004 | Williamson et al. | |
| 7,281,762 B1 * | 10/2007 | Getfield ........................ | 297/173 |
| 7,306,282 B2 * | 12/2007 | Salzer et al. .................. | 297/146 |
| 7,621,593 B2 * | 11/2009 | Dickinson ..................... | 297/163 |
| 7,651,160 B2 * | 1/2010 | Okumura et al. ............. | 297/163 |
| 7,675,742 B2 * | 3/2010 | Wu et al. .................. | 361/679.08 |
| 8,052,208 B2 * | 11/2011 | Kim et al. ...................... | 297/146 |
| 8,205,938 B2 | 6/2012 | Speh et al. | |
| 2001/0204683 | 8/2001 | Roy et al. | |
| 2009/0174234 A1 | 7/2009 | Vignal et al. | |
| 2011/0204683 A1* | 8/2011 | Roy et al. ....................... | 297/163 |
| 2012/0306241 A1* | 12/2012 | Winter et al. .................. | 297/163 |

* cited by examiner

*Primary Examiner* — David R Dunn
*Assistant Examiner* — Alexander Harrison
(74) *Attorney, Agent, or Firm* — James E. Brunton

(57) ABSTRACT

A utility tray for use with a substantially upright seat back which includes a seat back connector mechanism and a support tray assembly connected to the seat back connector mechanism. The support tray assembly includes a pair of first and second friction pivot joint assemblies connected to the seat back connector mechanism; a pair of support rails connected to and extending from the friction pivot joint assemblies; a first tray section connected to the pair of support rails for movement between a first retracted position and a second extended position, and a second tray section hingeably connected to the first tray section.

13 Claims, 5 Drawing Sheets

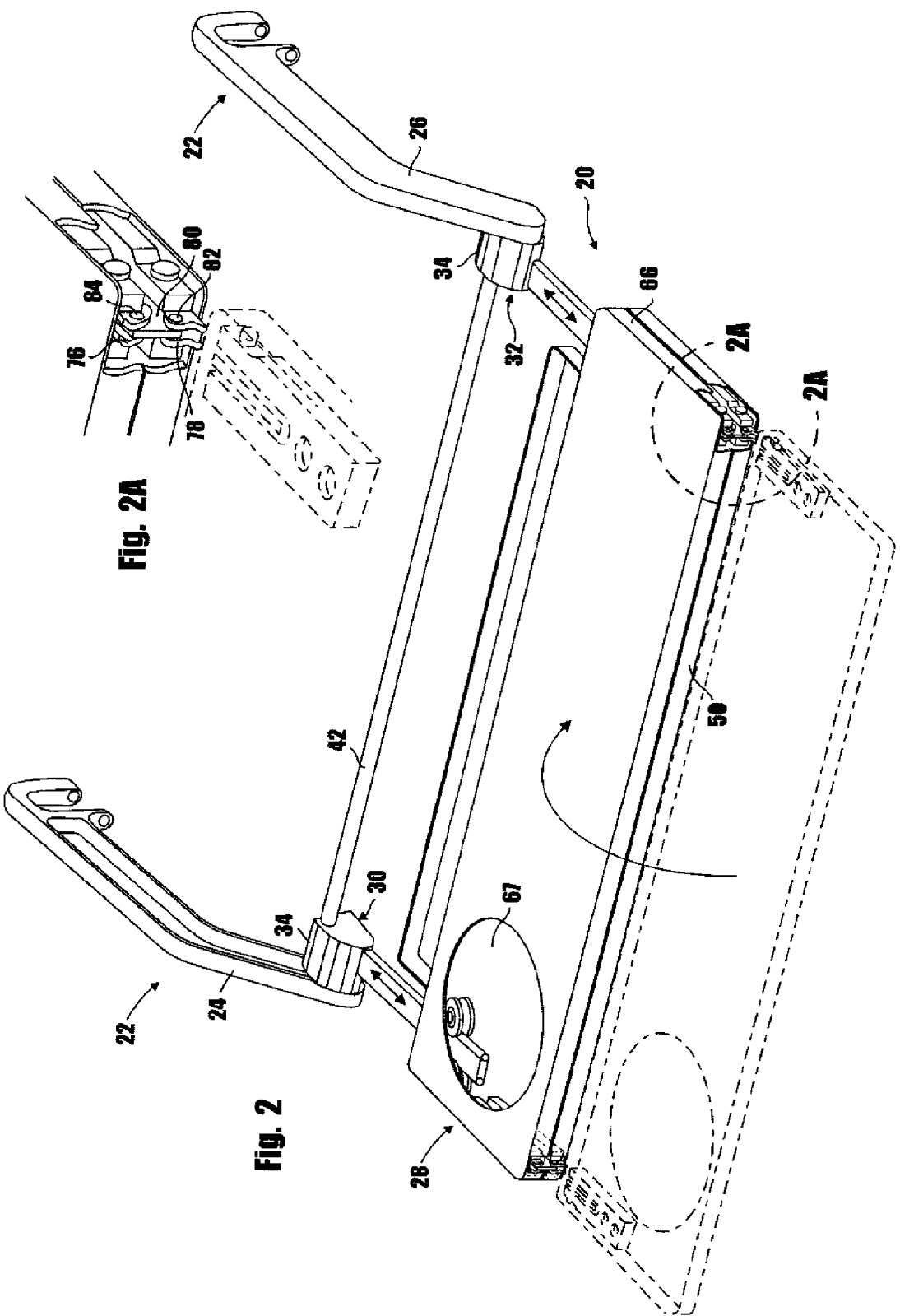

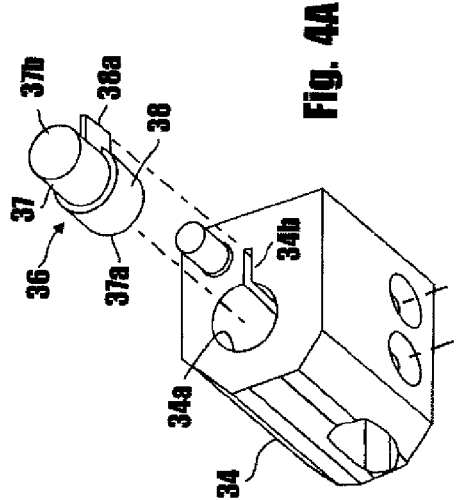
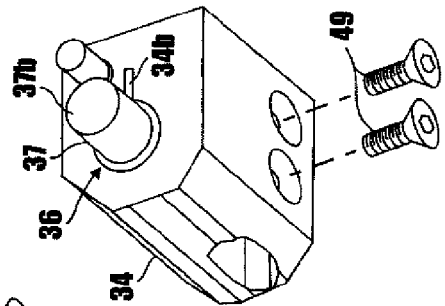
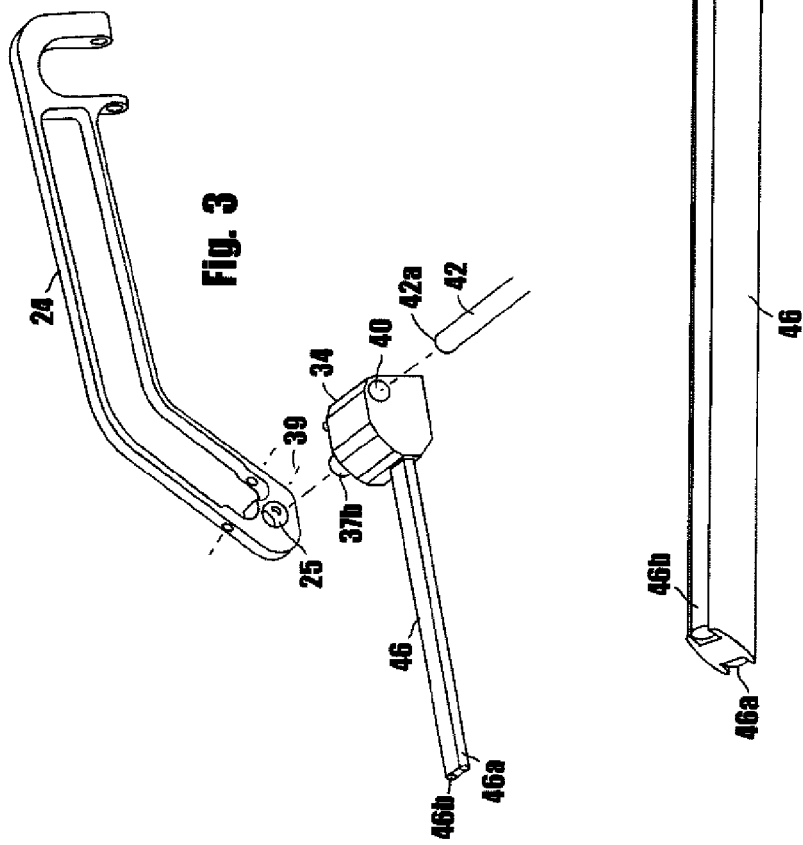

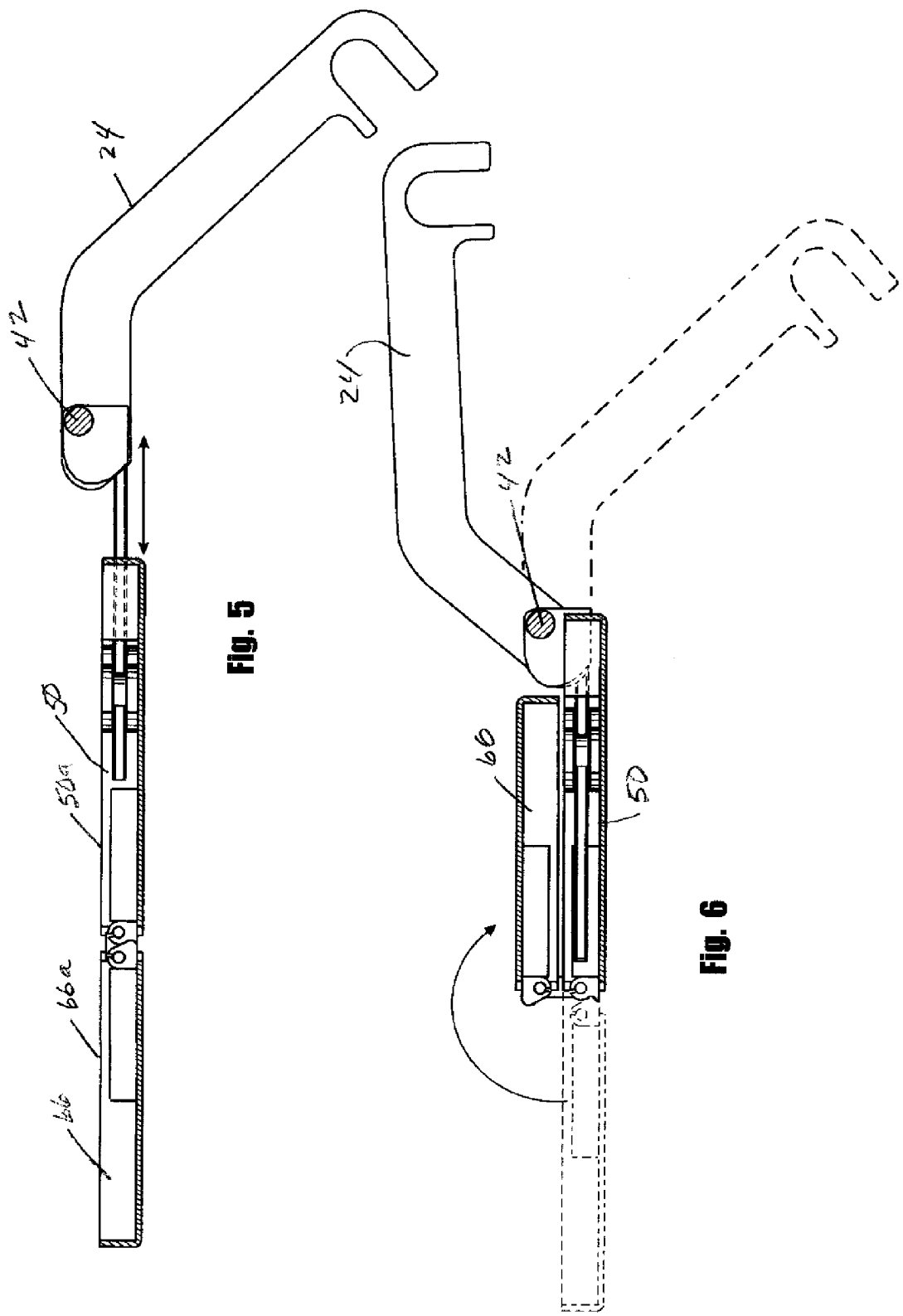

ADJUSTABLE UTILITY TRAY

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to utility trays for passenger vehicles. More particularly, the invention concerns a foldable food and beverage tray for use in commercial airplanes.

2. Description of Related Art Including Information Disclosed Under 37 CFR 1.97 and 1.98

Various types of utility trays for airplanes have been suggested in the past. Typically, such trays are pivotally connected to a seat back of the airplane and can be pivoted downwardly for use. When pivoted downwardly, the top surface of the tray is exposed and when stowed, the top surface faces inwardly toward the seat back. While some prior art utility trays are slidable along guide rails toward and away from the seat back, many lack any adjustability features. Those prior art food trays that are adjustable are often difficult to operate and frequently tend to malfunction. It is this prior art drawback that the present invention seeks to overcome by providing a novel food and beverage tray that is easy to operate and one that provides multiple degrees of easy and trouble free adjustment.

BRIEF SUMMARY OF THE INVENTION

By way of brief summary, one form of the novel utility tray of the invention for use with a substantially upright seat back includes a seat back connector mechanism and a support tray assembly connected to the seat back connector mechanism. The important support tray assembly comprises first and second friction pivot joint assemblies connected to the seat back connector mechanism; a connector shaft connected to and spanning the first and second friction pivot joint assemblies; first and second support rails connected to and extending from the friction pivot joint assemblies; a first substantially rectangular tray section connected to the first and second support rails for movement there along between a first retracted position and a second extended position; two spaced apart sets of conventional grooved roller bearings mounted on the first tray section for rolling engagement with the first and second support rails; and a second substantially rectangular tray section hingeably connected to the first tray section for movement between a first position coplanar with said first section and a second stowed position.

With the foregoing in mind, it is an object of the present invention to provide a utility tray, such as a food and beverage tray that is of a sturdy construction, is easy to operate and one that provides multiple degrees of trouble free, positive adjustment.

Another object of this invention is to provide a utility tray of the aforementioned character which is ideally suited for use in aircraft and one which is easy and convenient to stow and deploy.

Another object of the invention is to provide a utility tray of the character described in the preceding paragraphs that is of a simple design and one that can be inexpensively manufactured and installed.

Another object of the invention is to provide a novel utility tray of the type described in which the first and second tray sections are provided with an easy to clean supporting surface.

Another object of the invention is to provide a utility tray of the character described in the preceding paragraph in which the second tray section is provided with a conveniently located aperture for safely supporting a beverage container.

The foregoing as well as other objects of the invention will be met by the novel utility tray illustrated in the drawings and described in the specification that follows.

BRIEF DESCRIPTION OF THE DRAWINGS

FIG. 1 is a generally perspective view of one form of the adjustable utility table of the present invention.

FIG. 1A is a greatly enlarged, fragmentary view of the area designated in FIG. 1 as 1A-1A.

FIG. 2 is a generally perspective view, similar to FIG. 1 but showing the forward portion of the support tray assembly moved into a stowed position.

FIG. 2A is a greatly enlarged fragmentary view of the area designated in FIG. 2 as 2A-2A.

FIG. 3 is a generally perspective, fragmentary view of a portion of one side of the adjustable utility table of the invention.

FIG. 4 is a generally perspective, fragmentary, exploded view of one of the pivot joint assemblies and support rails of the adjustable utility table of the invention.

FIG. 4A is a fragmentary, exploded view of the pivot joint assembly shown in FIG. 4

FIG. 5 is a cross-sectional view taken along lines 5-5 of FIG. 1.

FIG. 6 is a cross-sectional, diagrammatic view similar to FIG. 5, but illustrating the adjustable utility table as it appears in a stowed configuration.

DESCRIPTION OF THE INVENTION

Figures 1, 1A:
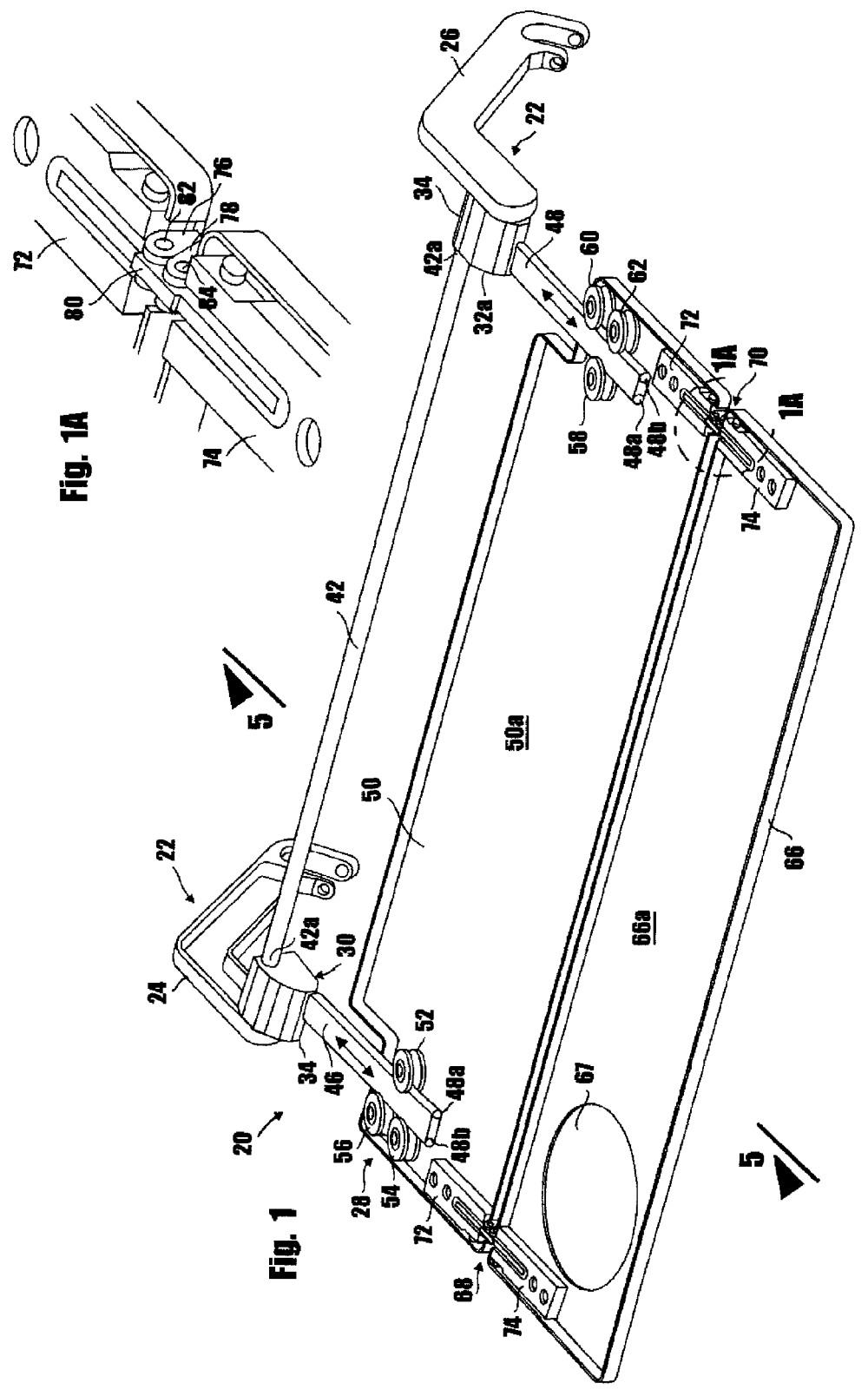
Figure 7:
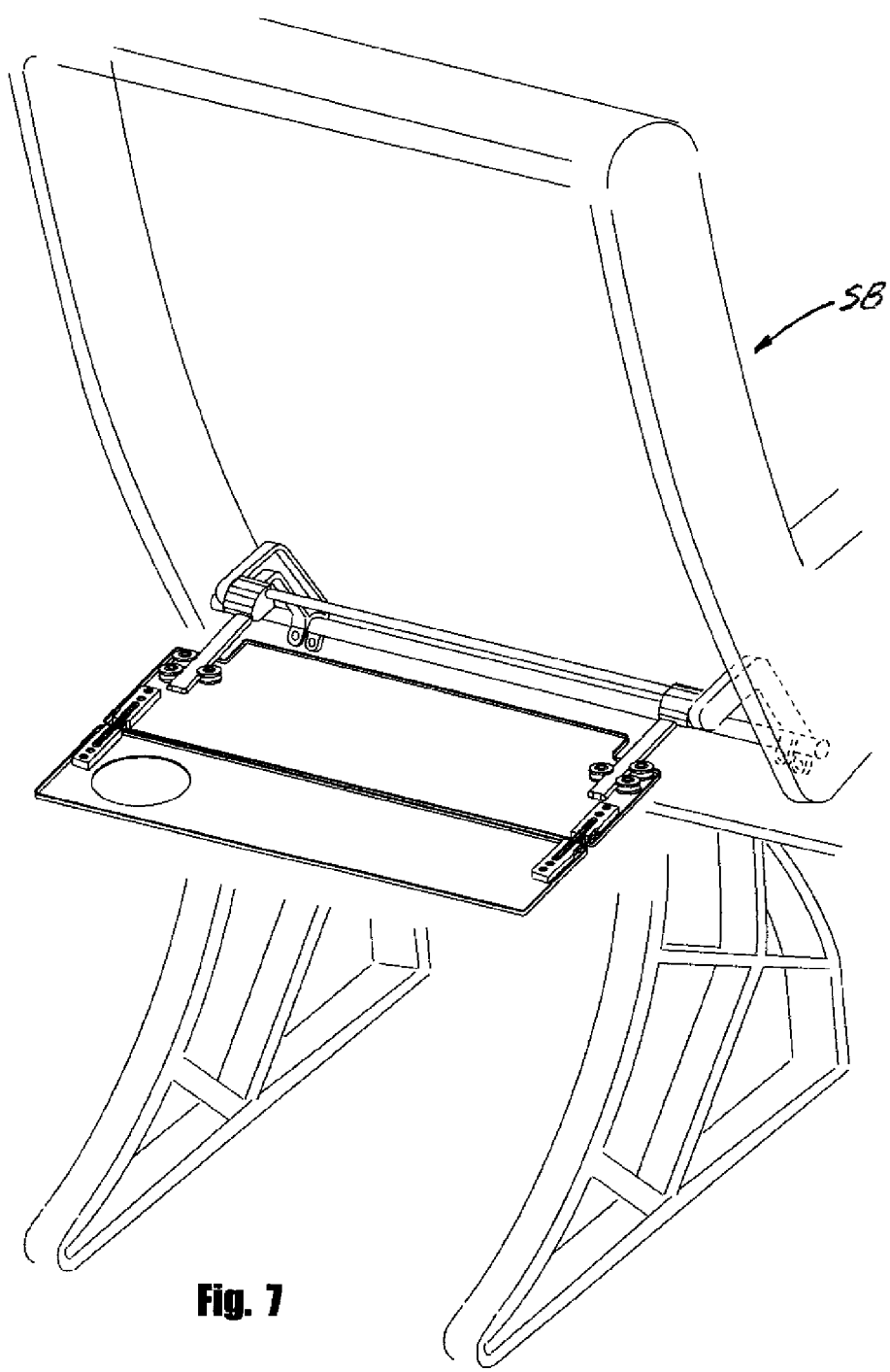
FIG. 7 is a generally perspective view illustrating the adjustable utility table of the invention as it appears when connected to the back of the vehicle seat and after having been moved into an operative configuration.

Referring to the drawings and particularly to FIGS. 1 and 2, one form of the novel utility table assembly of the invention is there shown and generally designated by the numeral 20. The utility table assembly 20 here comprises a seat back connector mechanism 22 that functions to interconnect the table assembly with a substantially upright seat back, such as the seat back found in a commercial aircraft. Mechanism 22 here comprises first and second transversely spaced apart connector arms 24 and 26, each of which is pivotally connected to the seat back "SB" in the conventional manner illustrated in FIG. 7 of the drawings.

Connected to the seat back connector mechanism 22 is a novel support tray assembly which is generally designated in the drawings by the numeral 28. Support tray assembly 28 here comprises a first friction pivot joint assembly 30 that is connected to the first connector arm 24 of said seat back connector mechanism and a second friction pivot joint assembly 32 that is connected to the second connector arm 26 of the seat back connector mechanism. Each of the first and second friction pivot joint assemblies here comprises a housing 34 having a first longitudinally extending bore 34a and a slot 34b extending outwardly from the bore (see FIGS. 4 and 4A of the drawings).

To interconnect the housings 34 with their respective support arms in the manner shown in FIG. 1 of the drawings, a pair of stub shaft assemblies 36 is provided. Each of the stub shaft assemblies 36 here comprises a stub shaft 37 having inboard and outboard end portions 37a and 37b. As indicated in FIG. 4A, a conventional torsion spring 38, the purpose of which will presently be described, closely circumscribes the inboard end portions 37a of each of the stub shafts 36. The inboard end portion 37a, along with the torsion spring 38, is receivable within the bore 34a of each of the housings 34. As illustrated in FIG. 4A, torsion spring 38 is provided with a tab portion 38a that is receivable within the slot 34b formed in the housings 34. As indicated in FIG. 3 of the drawings, the outboard end portion 37b of each of the stub shafts 36 is received within a bore 25 that is provided in each of the connector arms 24 and 26. With the construction thus described, the torsion springs 38 function to engage the inboard end portions of each of the stub shafts 36 in a manner to yieldably resist rotational movement of the housings 34 relative to the support arms 24 and 26 as a support tray assembly is raised and lowered. The outboard end portions 37b of each of the stub shafts can be secured within bores 25 by any appropriate means, such as by a set screw 39 (FIG. 3).

Each of the housings 34 of the first and second friction pivot joint assemblies is provided with a second longitudinally extending bore 40 (FIG. 3) connected to and spanning the first and second friction pivot joint assemblies 30 and 32 in the manner shown in FIG. 1 of the drawings is a connector shaft 42 the ends 42a of which are closely receivable within second bores 40.

Connected to and extending outwardly from first friction pivot joint assembly 30 in the manner indicated in FIG. 1 is an elongate first support rail 46 that is provided with a pair of transversely spaced apart rail shafts 46a and 46b. In a similar manner, an elongate second support rail 48 is connected to and extends outwardly from the second friction pivot joint assembly 32. Second support rail 48 is also provided with a pair of transversely spaced apart rail shafts 48a and 48b. The purpose of these support rails will presently be described. Support rails 46 and 48 are suitably connected to their respective housings 34 by threaded connectors 49 (FIGS. 4 and 4A).

Connected to the first and second support rails 46 and 48 for movement there along between a first retracted position and a second extended position is a first substantially rectangular tray section 50 having a generally planar support surface 50a. Mounted on support surface 50a are two spaced apart sets of conventional grooved roller bearings. More particularly, mounted on one side of the planar support surface 50a for engagement with first support rail 46 are first, second and third grooved roller bearings 52, 54 and 56 respectively. First roller bearing 52 is spaced apart from roller bearings 54 and 56 so that rail shaft 46a of support rail 46 rollably engages roller bearing 52 while rail shaft 46b of support rail 46 rollably engages roller bearings 54 and 56. Mounted on the opposite side of planar support surface 50a for engagement with second support rail 48 are fourth, fifth and sixth grooved roller bearings 58, 60 and 62 respectively. Fourth roller bearing 58 is spaced apart from roller bearings 60 and 62 so that rail shaft 48a of support rail 48 rollably engages roller bearing 58 while rail shaft 48b of support rail 48 rollably engages roller roller bearings 60 and 62. With this construction, the first tray section 50 can be smoothly moved from a retracted position proximate the first and second pivot joint assemblies 30 and 32 to the extended position shown in FIG. 1 of the drawings.

Support tray assembly 28 also comprises a second, substantially rectangular tray section 66 that is hingeably connected to the first tray section 50 for movement between a first position shown in FIG. 1, wherein the tray section is coplanar with the first tray section, and a second stowed position shown in FIG. 2 of the drawings. As best seen in FIG. 1, the second tray section 66 has a generally planar support surface 66a that is provided with a container receiving opening 67. The first and second tray sections are interconnected by first and second friction hinge assemblies 68 and 70, the character of which will presently be described.

Each of the first and second friction hinge assemblies 68 and 70 of the present form of the invention comprise a first hinge connector housing 72 that is connected to the first tray section 58 and a second hinge connector housing 74 that is connected to the second tray section 66. Connected to the first hinge connector housing 72 is a first pair of spaced apart apertured hinge arms 76 and connected to the second hinge connector housing 74 is a second pair of spaced apart aperture hinge arms 78. As best seen in FIG. 1A, disposed between the first and second pairs of spaced apart apertured hinge arms 76 and 78 is a connecting link 80 that is provided with first and second spaced apart pin receiving apertures that receive first and second friction imparting hinge pins 82 and 84. First and second friction imparting hinge pins 82 and 84 function to pivotally interconnect the spaced apart apertured hinge arms with the connecting link (FIG. 1A) and to frictionally resist pivotal movement of the hinge arms. Friction hinge assemblies 68 and 70 are readily commercially available from several sources, including Hanaya, Inc. of Ponte Vedra, Fla. Additional information concerning the construction of these hinge assemblies is available from this company.

When the utility tray of the invention is in the operative position shown in FIG. 1, the upper surfaces of the first and second tray sections can be used to support a food tray, can be used as a writing surface, or can be used to support other objects, such as laptop computers and the like. When desired, a beverage container, such as a soft drink beverage container, can be inserted into the beverage container receiving opening 67 that is provided in the second tray section 66. If the utility tray user desires to foreshorten the tray assembly, the second section 66 can be folded about hinge assemblies 68 and 70 into the position shown by the solid lines in FIGS. 2 and 2A of the drawings (see also FIG. 6). Similarly, the first and second tray sections can be slidably moved along support rails 46 and 48 into the position shown in FIG. 6. If desired, the first and second tray sections can be pivoted upwardly about the first and second friction pivot joint assemblies 30 and 32, against the urging of the torsion springs 40. Once again, it is important to note that these novel friction pivot joint assemblies uniquely tend to hold the tray sections in position and function to prevent accidental, unintended pivotal movement of the friction tray sections either upwardly or downwardly.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. A utility table assembly for use with a substantially upright seat back comprising:
   (a) a seat back connector mechanism comprising first and second transversely spaced apart connector arms pivotally connected to the seat back; and
   (b) a support tray assembly connected to said seat back connector mechanism, said support tray assembly comprising:
      (i) a first friction pivot joint assembly connected to said first connector arm of said seat back connector mechanism;
      (ii) a second friction pivot joint assembly connected to said second connector arm of said seat back connector mechanism;
      (iii) a connector shaft connected to and spanning said first and second friction pivot joint assemblies;
      (iv) a first elongate support rail connected to said first friction pivot joint assembly and extending outwardly therefrom, said first support rail including transversely spaced apart rail shafts;
      (v) a second elongate support rail connected to said second friction pivot joint assembly and extending outwardly therefrom, said second support rail including transversely spaced apart rail shafts;
      (vi) a first, substantially rectangular tray section connected to said first and second support rails for movement there along between a first retracted position and a second extended position, said first substantially rectangular tray section having a support surface; and
      (vii) at least two transversely spaced apart, grooved bearings rotatably mounted on said support surface of said first substantially rectangular tray section and being in rotatable engagement with said transversely spaced apart rail shafts of said first elongate support rail;
      (viii) at least two transversely spaced apart, grooved bearings rotatably mounted on said support surface of said first substantially rectangular tray section and begin in rotatable engagement with said transversely spaced apart rail shafts of said second elongate support rail; and
      (ix) a second substantially rectangular tray section hingeably connected to said first tray section for movement between a first position coplanar with said first section and a second stowed position, said second substantially rectangular tray section having a support surface.

2. The utility table assembly as defined in claim 1 in which said first and second friction pivot joint assemblies each comprise:
   (a) a housing connected to said connector shaft of said support tray assembly, said housing having a longitudinally extending bore and a slot extending outwardly from said bore;
   (b) a stub shaft rotatably mounted within said bore; and
   (c) a torsion spring circumscribing said stub shaft, said torsion spring having a tab receivable within said slot provided in said housing.

3. The utility table assembly as defined in claim 1, further including first and second tray hinge assemblies, each comprising:
   (a) a first hinge connector housing connected to said first tray section;
   (b) a second hinge connector housing connected to said second tray section;
   (c) a first pair of spaced apart apertured hinge arms connected to said first hinge connector housing;
   (d) a second pair of spaced apart apertured hinge arms connected to said second hinge connector housing;
   (e) a connecting link disposed between said first and second pairs of spaced apart apertured hinge arms, said connecting link having first and second spaced apart pin receiving apertures;
   (f) a first friction imparting hinge pin receivable within said first pin receiving aperture of said connecting link for pivotally interconnecting said first pair of spaced apart apertured hinge arms with said connecting link; and
   (g) a second friction imparting hinge pin receivable within said second pin receiving aperture of said connecting link for pivotally interconnecting said second pair of spaced apart apertured hinge arms with said connecting link.

4. The utility table assembly as defined in claim 1 in which said second substantially rectangular tray section is provided with a container receiving opening.

5. A utility table assembly for use with a substantially upright seat back comprising:
   (a) a seat back connector mechanism comprising first and second transversely spaced apart connector arms pivotally connected to the seat back; and
   (b) a support tray assembly connected to said seat back connector mechanism, said support tray assembly comprising:
      (i) a first friction pivot joint assembly connected to said first connector arm of said seat back connector mechanism said first friction pivot joint assembly comprising:
         a. a housing having a longitudinally extending bore and a slot extending outwardly from said bore;
         b. a stub shaft rotatably mounted within said bore of said housing; and
         c. a torsion spring circumscribing said stub shaft, said torsion spring having a tab receivable within said slot provided in said housing;
      (ii) a second friction pivot joint assembly connected to said second connector arm of said seat back connector mechanism, said second friction pivot joint assembly comprising:
         a. a housing having a longitudinally extending bore and a slot extending outwardly from said bore;
         b. a stub shaft rotatably mounted within said bore of said housing; and
         c. a torsion spring circumscribing said stub shaft, said torsion spring having a tab receivable within said slot provided in said housing;
      (iii) connector shaft connected to and spanning said first and second friction pivot joint assemblies;
      (iv) a first support rail connected to said first friction pivot joint assembly, said first support rail having transversely spaced apart rail shafts;
      (v) a second support rail connected to said second friction pivot joint assembly, said second support rail having transversely spaced apart rail shafts;
      (vi) a first, substantially rectangular tray section connected to said first and second support rails for movement there along between a first retracted position and a second extended position, said first substantially rectangular tray section having a support surface;
      (vii) a first set of spaced apart roller bearings carried by said support surface of said first substantially rectangular tray for engagement with said transversely spaced apart rail shafts of said first support rail;

(viii) a second set of spaced apart roller bearings carried by said support surface of said first substantially rectangular tray for engagement with said transversely spaced apart rail shafts of said second support rail; and
(ix) a second substantially rectangular tray section hingeably connected to said first tray section for movement between a first position coplanar with said first section and a second stowed position, said second substantially rectangular tray section having a support surface.

6. The utility table as defined in claim 5 in which each of said first and second sets of spaced apart roller bearings comprises three spaced apart, grooved roller bearings.

7. The utility table assembly as defined in claim 5, further including first and second tray hinge assemblies, each comprising:
   (a) a first hinge connector housing connected to said first tray section;
   (b) a second hinge connector housing connected to said second tray section;
   (c) a first pair of spaced apart apertured hinge arms connected to said first hinge connector housing;
   (d) a second pair of spaced apart apertured hinge arms connected to said second hinge connector housing;
   (e) a connecting link disposed between said first and second pairs of spaced apart apertured hinge arms, said connecting link having first and second spaced apart pin receiving apertures;
   (f) a first friction imparting hinge pin receivable within said first pin receiving aperture of said connecting link for pivotally interconnecting said first pair of spaced apart apertured hinge arms with said connecting link; and
   (g) a second friction imparting hinge pin receivable within said second pin receiving aperture of said connecting link for pivotally interconnecting said second pair of spaced apart apertured hinge arms with said connecting link.

8. The utility table assembly as defined in claim 7 in which said second substantially rectangular tray section is provided with a container receiving opening.

9. A utility table assembly for use with a substantially upright seat back comprising:
   (a) a seat back connector mechanism comprising first and second transversely spaced apart connector arms pivotally connected to the seat back; and
   (b) a support tray assembly connected to said seat back connector mechanism, said support tray assembly comprising:
      (i) a first friction pivot joint assembly connected to said first connector arm of said seat back connector mechanism said first friction pivot joint assembly comprising:
         a. a housing having a longitudinally extending bore and a slot extending outwardly from said bore;
         b. a stub shaft rotatably mounted within said bore of said housing; and
         c. a torsion spring circumscribing said stub shaft, said torsion spring having a tab receivable within said slot provided in said housing;
      (ii) a second friction pivot joint assembly connected to said second connector arm of said seat back connector mechanism, said second friction pivot joint assembly comprising:
         a. a housing having a longitudinally extending bore and a slot extending outwardly from said bore;
         b. a stub shaft rotatably mounted within said bore of said housing; and
         c. a torsion spring circumscribing said stub shaft, said torsion spring having a tab receivable within said slot provided in said housing;
      (iii) a connector shaft connected to and spanning said first and second friction pivot joint assemblies;
      (iv) a first support rail connected to said first friction pivot joint assembly, said first support rail having transversely spaced apart rail shafts;
      (v) a second support rail connected to said second friction pivot joint assembly, said second support rail having transversely spaced apart rail shafts;
      (vi) a first, substantially rectangular tray section connected to said first and second support rails for movement there along between a first retracted position and a second extended position, said first substantially rectangular tray section having a support surface;
      (vii) a first set of spaced apart roller bearings carried by said support surface of said first substantially rectangular tray for engagement with said transversely spaced apart rail shafts of said first support rail, said first set of spaced apart roller bearings comprising three spaced apart, grooved roller bearings;
      (viii) a second set of spaced apart roller bearings carried by said support surface of said first substantially rectangular tray for engagement with said transversely spaced apart rail shafts of said second support rail, said second set of spaced apart roller bearings comprising three spaced apart, grooved roller bearings;
      (ix) a second substantially rectangular tray section hingeably connected to said first tray section for movement between a first position coplanar with said first section and a second stowed position, said second substantially rectangular tray section having a support surface provided with a container receiving opening; and
      (x) first and second tray hinge assemblies operably associated with said first and second substantially rectangular tray sections, each of said first and second tray hinge assemblies comprising:
         a. a first hinge connector housing connected to said first tray section;
         b. a second hinge connector housing connected to said second tray section;
         c. a first pair of spaced apart apertured hinge arms connected to said first hinge connector housing;
         d. a second pair of spaced apart apertured hinge arms connected to said second hinge connector housing;
         e. a connecting link disposed between said first and second pairs of spaced apart apertured hinge arms, said connecting link having first and second spaced apart pin receiving apertures;
         f. a first friction imparting hinge pin receivable within said first pin receiving aperture of said connecting link for pivotally interconnecting said first pair of spaced apart apertured hinge arms with said connecting link; and
         g. a second friction imparting hinge pin receivable within said second pin receiving aperture of said connecting link for pivotally interconnecting said second pair of spaced apart apertured hinge arms with said connecting link.

10. A utility table assembly for use with a substantially upright seat back comprising:
(a) a seat back connector mechanism comprising first and second transversely spaced apart connector arms pivotally connected to the seat back; and
(b) a support tray assembly connected to said seat back connector mechanism, said support tray assembly comprising:
(i) a first friction pivot joint assembly connected to said first connector arm of said seat back connector mechanism;
(ii) a second friction pivot joint assembly connected to said second connector arm of said seat back connector mechanism;
(iii) a connector shaft connected to and spanning said first and second friction pivot joint assemblies;
(iv) a first elongate support rail connected to and extending outwardly from said first friction pivot joint assembly;
(v) a second elongate support rail connected to said second friction pivot joint assembly and extending outwardly therefrom;
(vi) a first, substantially rectangular tray section connected to said first and second elongate support rails for movement there along between a first retracted position and a second extended position, said first substantially rectangular tray section having a support surface;
(vii) a first roller bearing carried by said first substantially rectangular tray section for rolling engagement with said first support rail;
(viii) a second roller bearing carried by said first substantially rectangular tray section for rolling engagement with said first support rail;
(ix) a fourth roller bearing carried by said first substantially rectangular tray section for rolling engagement with said second support rail;
(x) a fifth roller bearing carried by said first substantially rectangular tray section for rolling engagement with said second support rail; and
(xi) a second substantially rectangular tray section hingeably connected to said first tray section for movement between a first position coplanar with said first section and a second stowed position.

11. The utility table assembly as defined in claim 10 further including a third roller bearing carried by said first substantially rectangular tray section for rolling engagement with said first support rail and a sixth roller bearing carried by said first substantially rectangular tray section for rolling engagement with said second support rail.

12. The utility table assembly as defined in claim 10 in which said first and second friction pivot joint assemblies each comprise:
(a) a housing connected to said connector shaft of said support tray assembly, said housing having a longitudinally extending bore and a slot extending outwardly from said bore;
(b) a stub shaft rotatably mounted within said bore; and
(c) a torsion spring circumscribing said stub shaft, said torsion spring having a tab receivable within said slot provided in said housing.

13. The utility table assembly as defined in claim 10, further including first and second tray hinge assemblies, each comprising:
(a) a first hinge connector housing connected to said first tray section;
(b) a second hinge connector housing connected to said second tray section;
(c) a first pair of spaced apart aperture hinge arms connected to said first hinge connector housing;
(d) a second pair of spaced apart aperture hinge arms connected to said second hinge connector housing;
(e) a connecting link disposed between said first and second pairs of spaced apart aperture hinge arms, said connecting link having first and second spaced apart pin receiving apertures;
(f) a first friction imparting hinge pin receivable within said first pin receiving aperture of said connecting link for pivotally interconnecting said first pair of spaced apart aperture hinge arms with said connecting link; and
(g) a second friction imparting hinge pin receivable within said second pin receiving aperture of said connecting link for pivotally interconnecting said second pair of spaced apart aperture hinge arms with said connecting link.

\* \* \* \* \*